Sept. 2, 1958       R. S. GROCHMAL       2,850,320
ZIPPER SEAL FOR EXPANDABLE HOUSE TRAILER
Filed Feb. 7, 1957
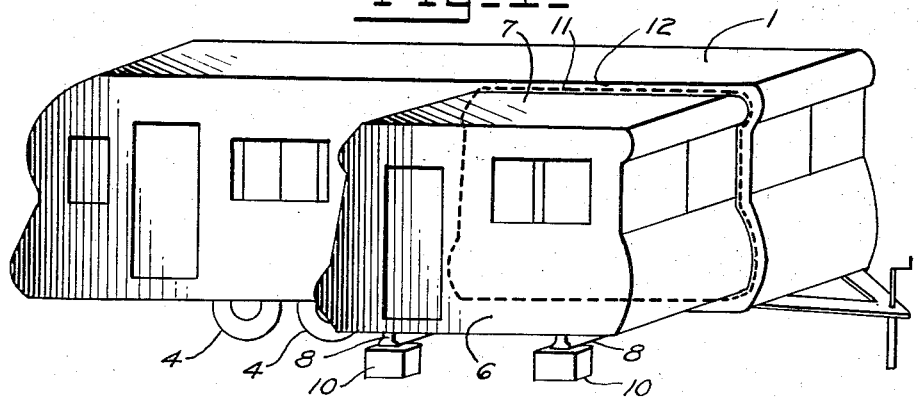
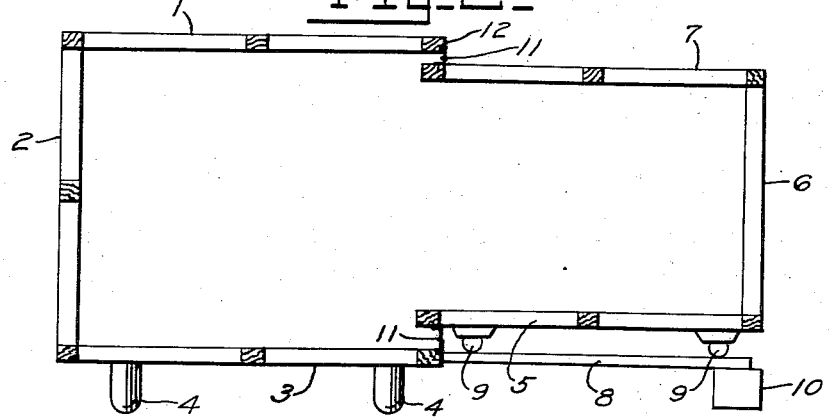
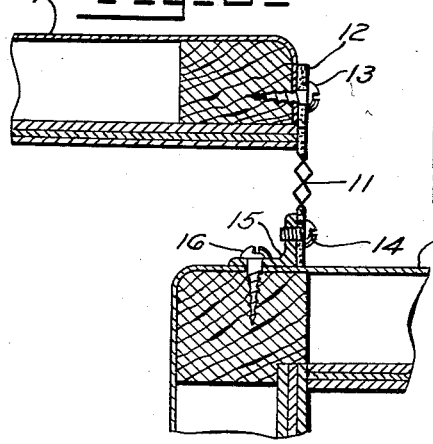
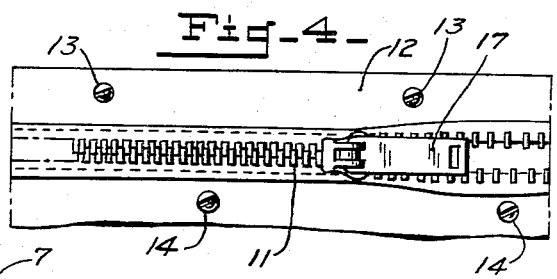
INVENTOR.
Richard S. Grochmal
BY *L. S. Michelman*
           Atty.

United States Patent Office 2,850,320
Patented Sept. 2, 1958

2,850,320
ZIPPER SEAL FOR EXPANDABLE HOUSE TRAILER
Richard S. Grochmal, Indian Orchard, Mass.
Application February 7, 1957, Serial No. 638,848
2 Claims. (Cl. 296—23)

This invention is concerned with improvements in the means for sealing the movable sections of expandable trailers. Many trailers have been manufactured and placed upon the market which have the facilities for expanding into larger units once they have been parked, after having been driven along a road. These trailers have the unique need of a means for seating the expanded portions together so that the weather and the elements may not disturb the comfort of the inhabitants inside of the trailer. The tolerances in manufacturing such types of trailers are, of course, critical. There is also the problem of the fact that either the expanded portion of the trailer or the main body portion of the trailer may become lower and settle, leaving one or the other in a higher position and causing a break in the means that is used to seal the separate trailer portions.

The seals used by most of these types of trailers are inadequately, clumsy, and do not properly solve the aforementioned difficulties and problems.

It is an object of the within invention to provide a seal arrangement for expandable trailers which may enable the trailers to be manufactured with greater tolerances of dimension than heretofore.

It is another object of the within invention to provide a seal that will be sufficiently resilient, and maintain any movements by either the fixed, or the expanded portion of a trailer, closed.

It is yet another object of the within invention to provide a comfortable air tight living-room section for a mobile type home.

It is yet another object of the within invention to provide a seal that may be easily engaged and disengaged.

It is still another object of the within invention to provide a seal that may be light of weight, easily handled, and durable.

It is yet a further object of the within invention to provide a seal which has excellent insulation characteristics for keeping out the cold and heat from within the trailer.

These, and other objects, are attained by the use of a water proof zipper assembly affixed one part to the body of the trailer that is immovable and another part to the expandable or movable part of the trailer. When the two portions of the trailer have been extended, the zipper assembly is then engaged and the two sides of the zipper are closed by the movement of the zipper fastener.

For a better understanding of the invention, reference is made to the following detailed description and the accompanying drawing in which:
Figure 1 is a perspective view of the trailer expanded.
Figure 2 is a sectional view of the expanded trailer.
Figure 3 is a view of a cross section of a section of a zipper sealing the fixed portion of the trailer and the expanded portion of the trailer.
Figure 4 is a closeup of the zipper showing how the sides thereof are secured to the trailer portion.

The trailer has a top 1 of the main body portion. The left side 2 of the main body portion is in the rear of the front 6 expanded portion. The bottom of the main body portion 3 is lower than the bottom 5 of the expanded portion. Beneath the bottom 3 of the main body portion are the conventional wheels 4. The top 7 of the expanded portion is, of course, lower than the top 1 of the main body portion. The expanded portion has rollers 9 which engage the rails 8 when the expanded portion is in its extended position as shown in Figure 2. A block 10 is used to support the rails 8.

The zipper 11 circumscribes the entire area that is left open when the expanded portion is pulled from the main portion of the trailer. A cross sectional view of a section of the zipper arrangement is shown in detail in Figure 3. As can be seen the upper portion 12 of the zipper is affixed by a wide-head self-threading screw 13 to the edge of the top portion 1. At the bottom an L-shaped angle support 15 is employed. It is secured by a self-threading screw 16 to the top edge 7 of the expanded portion. A bolt 14 is set and threaded within the vertical portion of the angle 15 and contains beneath its head the side 12 of the zipper. A front view of the zipper arrangement is disclosed in Figure 4 wherein the heads of the self-threading screws 13 are shown and the heads of the threaded bolts 14 are indicated on the lower side of the zipper 11. The fastener 17 of the water proof zipper 11 is shown to be of the conventional type.

As can be seen, the zipper follows the path of the dotted line in Figure 1. The arrangement shown in section in Figure 3 is similar throughout the entire locus of the dotted line shown in Figure 1.

The zipper unfastens similarly to a coat zipper so that when it is time to asemble the expanded portion of the trailer into the fixed portion the zipper will not bind. As a result thereof, there is no necessity of storing extra equipment to connect up the seal arrangement as disclosed.

Certain dimensions in the drawing have been exaggerated. This has been done in order to teach more clearly the within invention.

Changes in detail of construction are anticipated and held to be within the scope of this invention. The species or embodiment herein disclosed is but one of a number of ways of employing the zipper in the arrangement of sealing an expanded trailer.

Having thus described my invention,
I claim:

1. A seal for a trailer having a fixed and an expandable portion, said seal comprising a zipper assembly having two separate strips of fabric, said fabric being waterproof, zipper teeth on one edge of each of said strips, means for securing the other edge of one of said strips to the edge of the expanded portion of said trailer proximate the fixed portion, said strips circumscribing the top edge, side edges and bottom edge of said expandable portion of the trailer, means for securing the other edge of the second of said strips to the inner open edge of the fixed portion of said trailer proximate the expanded portion of said trailer, said strip circumscribing the top inside edge, the side inside edges, and the bottom inside edge of the fixed portion of the trailer, a zipper fastener interconnecting the teeth of each of the strips whereby the teeth of each strip may be interlocked or released, and when interlocked whereby the outside air and the elements are shut off from entering the inside of the trailer through the area between the expanded and fixed portions of said trailer.

2. A seal as noted in claim 1 wherein the means for securing the strip to the expanded portion of the trailer is an L-shaped bracket that is screwed to the edges of the expanded portion of the trailer.

References Cited in the file of this patent
UNITED STATES PATENTS

| 2,002,596 | Westrope | May 28, 1935 |
| 2,426,133 | Willis | Aug. 19, 1947 |
| 2,581,985 | Tuerk | Jan. 8, 1952 |
| 2,606,057 | Johnson | Aug. 5, 1952 |
| 2,716,782 | Paulsen | Sept. 6, 1955 |
| 2,798,760 | Hille | July 9, 1957 |
| 2,802,524 | Peacock | Aug. 13, 1957 |